US011943727B2

(12) United States Patent
Yuan

(10) Patent No.: US 11,943,727 B2
(45) Date of Patent: Mar. 26, 2024

(54) SYNCHRONIZATION SIGNAL BLOCK SENDING AND RECEIVING METHOD AND APPARATUS

(71) Applicant: HUAWEI TECHNOLOGIES CO., LTD., Guangdong (CN)

(72) Inventor: Pu Yuan, Shenzhen (CN)

(73) Assignee: HUAWEI TECHNOLOGIES CO. LTD., Guangdong (CN)

(*) Notice: Subject to any disclaimer, the term of this patent is extended or adjusted under 35 U.S.C. 154(b) by 469 days.

(21) Appl. No.: 17/344,451

(22) Filed: Jun. 10, 2021

(65) Prior Publication Data
US 2021/0306964 A1 Sep. 30, 2021

Related U.S. Application Data

(63) Continuation of application No. PCT/CN2019/123116, filed on Dec. 4, 2019.

(30) Foreign Application Priority Data

Dec. 11, 2018 (CN) .......................... 201811513585.1

(51) Int. Cl.
H04W 56/00 (2009.01)
H04B 7/0404 (2017.01)

(52) U.S. Cl.
CPC ....... H04W 56/001 (2013.01); H04W 56/006 (2013.01); H04B 7/0404 (2013.01)

(58) Field of Classification Search
CPC . H04W 56/001; H04W 56/006; H04W 56/00; H04W 4/46; H04B 7/0404; H04L 27/2655

(Continued)

(56) References Cited

U.S. PATENT DOCUMENTS

2018/0241605 A1 8/2018 Luo
2019/0306850 A1* 10/2019 Zhang .................. H04B 7/0626
(Continued)

FOREIGN PATENT DOCUMENTS

CN 101645722 A 2/2010
CN 106304346 A 1/2017
(Continued)

OTHER PUBLICATIONS

3GPP TS 38.211 V15.3.0 : "3rd Generation Partnership Project; Technical Specification Group Radio Access Network; NR;Physical channels and modulation(Release 15)",Sep. 2018, total 96 pages.
(Continued)

Primary Examiner — Rownak Islam
(74) Attorney, Agent, or Firm — WOMBLE BOND DICKINSON (US) LLP

(57) ABSTRACT

A synchronization signal block sending and receiving method and apparatus are described. The method includes a first terminal determining, based on a correspondence between information about locations of M antenna panels and P synchronization signal blocks of the first terminal and information about locations of N antenna panels, a synchronization signal block corresponding to each of the N antenna panels, where the information about the locations of the M antenna panels is used to indicate the locations of the M antenna panels on the first terminal, the N antenna panels are included in the M antenna panels, N is less than or equal to M, M, N and P are positive integers, and P is an integer multiple of M. Then, the first terminal separately sends, by using each of the N antenna panels, the synchronization signal block corresponding to each of the N antenna panels. This application is applicable to a V2V scenario.

21 Claims, 10 Drawing Sheets

(58) Field of Classification Search
USPC .......................................................... 370/503
See application file for complete search history.

(56) References Cited

U.S. PATENT DOCUMENTS

| | | | | |
|---|---|---|---|---|
| 2020/0029274 | A1* | 1/2020 | Cheng | H04W 76/28 |
| 2020/0044709 | A1* | 2/2020 | Kang | H04W 56/0015 |
| 2021/0336737 | A1* | 10/2021 | Li | H04L 5/0094 |

FOREIGN PATENT DOCUMENTS

| | | | |
|---|---|---|---|
| CN | 107548146 | A | 1/2018 |
| CN | 108270710 | A | 7/2018 |
| CN | 108307496 | A | 7/2018 |
| CN | 108769894 | A | 11/2018 |
| WO | 2013155978 | A1 | 10/2013 |
| WO | 2018030783 | A1 | 2/2018 |

OTHER PUBLICATIONS

Akoum Salam et al: "Robust Beam Management for Mobility in mmWave Systems", 2018 52ND ASILOMAR Conference on Signals, Systems, and Computers, IEEE, Oct. 28, 2018 (Oct. 28, 2018), pp. 1269-1273, XP033521044.

\* cited by examiner

US 11,943,727 B2

SYNCHRONIZATION SIGNAL BLOCK SENDING AND RECEIVING METHOD AND APPARATUS

CROSS-REFERENCE TO RELATED APPLICATIONS

This application is a continuation of International Application No. PCT/CN2019/123116, filed on Dec. 4, 2019, which claims priority to Chinese Patent Application No. 201811513585.1, filed on Dec. 11, 2018. The disclosures of the aforementioned applications are hereby incorporated by reference in their entireties.

TECHNICAL FIELD

This application relates to the field of communication technologies, and in particular, to a synchronization signal block sending and receiving method and a synchronization signal block sending and receiving apparatus.

BACKGROUND

A vehicle to everything (e.g., vehicle to x, V2X, and the like) technology is a key technology in a future intelligent transportation system. Communication between vehicles and communication between a vehicle and a base station can be performed by using the V2X technology, so that the vehicle can obtain all traffic information such as a real-time road condition, road information, and pedestrian information. This effectively improves driving safety of vehicles, reduces congestion, improves traffic efficiency, provides in-vehicle entertainment information, and the like.

A vehicle to vehicle (e.g., vehicle to vehicle, V2V, and the like) technology is a type of the V2X technology. By using the V2V technology, wireless information may be directly exchanged, rather than forwarded by using a base station, between vehicle user equipments (VUE). When the V2V technology is used, how VUE determines a relative orientation to another VUE to ensure driving safety of vehicles is a technical problem that needs to be resolved urgently.

SUMMARY

This application provides a synchronization signal block sending and receiving method and a synchronization signal block sending and receiving apparatus for a terminal to determine a relative orientation of the terminal to another terminal.

To achieve the foregoing objective, this application provides the following technical solutions.

According to a first aspect, a synchronization signal block sending method is provided. The method includes: A first terminal determines, based on a correspondence between information about locations of M antenna panels and P synchronization signal blocks of the first terminal and information about locations of N antenna panels, a synchronization signal block corresponding to each of the N antenna panels, where the information about the locations of the M antenna panels is used to indicate the locations of the M antenna panels on the first terminal, the N antenna panels are included in the M antenna panels, N is less than or equal to M, M, N and P are positive integers, and P is an integer multiple of M. The first terminal separately sends, by using each of the N antenna panels, the synchronization signal block corresponding to each of the N antenna panels.

Based on the foregoing technical solution, antenna panels at different locations on the first terminal correspond to different synchronization signal blocks. Therefore, for a receive end of a synchronization signal block, the receive end can determine, based on the received synchronization signal block, a location, on the first terminal, of an antenna panel that sends the synchronization signal block, and the receive end can determine a relative orientation of the receive end to the first terminal.

P is equal to M, and information about a location of one of the M antenna panels of the first terminal corresponds to one of the M synchronization signal blocks. Alternatively, P is at least twice greater than M, and information about a location of one of the M antenna panels of the first terminal corresponds to at least two of the P synchronization signal blocks.

In embodiments of a possible design, the synchronization signal block is used to indicate information about a location of an antenna panel that sends the synchronization signal block.

In embodiments of a possible design, the synchronization signal block includes a primary synchronization signal, a secondary synchronization signal, and a physical broadcast channel.

In embodiments of a possible design, the correspondence between the information about the locations of the M antenna panels and the P synchronization signal blocks includes: a correspondence between the information about the locations of the M antenna panels and P resource mapping modes, where the resource mapping mode is used to indicate a location of a time-frequency resource occupied by the primary synchronization signal and a location of a time-frequency resource occupied by the secondary synchronization signal in the synchronization signal block. In this way, the synchronization signal blocks corresponding to the antenna panels at different locations on the first terminal use different resource mapping modes, so that the synchronization signal blocks corresponding to the antenna panels at different locations on the first terminal are constructed differently, and the antenna panels at different locations on the first terminal correspond to different synchronization signal blocks.

In embodiments of a possible design, the correspondence between the information about the locations of the M antenna panels and the P synchronization signal blocks includes a correspondence between the information about the locations of the M antenna panels and sequences of P secondary synchronization signals. In this way, sequences of secondary synchronization signals corresponding to the antenna panels at different locations on the first terminal are different, so that the antenna panels at different locations on the first terminal correspond to different synchronization signal blocks.

In embodiments of a possible design, a sequence of a secondary synchronization signal is generated according to the following formula: $c(n)=(x_0(n+i_1+k)+x_1(n+i_2+l)) \bmod 2$, where $c(n)$ is the sequence of the secondary synchronization signal, where n is an integer greater than or equal to 0 and less than or equal to 126;

$$i_1 = \left(3 \times \left\lfloor \frac{NID1}{112} \right\rfloor + NID2\right) \times 5,$$

where NID1 is an identifier of a physical cell identifier group, NID1 is an integer greater than or equal to 0 and less than or equal to 335, NID2 is an intra-group identifier of the physical cell identifier group, and a value range of NID2 is {0, 1, 2}; $x_0(n)$ and $x_1(n)$ are both M-sequences; $i_2$=(NID1) mod 112; and k and l are integers, and k and l are determined based on the information about the location of the antenna panel.

According to a second aspect, a synchronization signal block receiving method is provided. The method includes: A second terminal receives a plurality of synchronization signal blocks. The second terminal determines a synchronization signal block with the greatest signal strength from the plurality of synchronization signal blocks. The second terminal determines, based on a correspondence between information about locations of M antenna panels and P synchronization signal blocks of a first terminal, information about a location of an antenna panel used by the first terminal to send the synchronization signal block with the greatest signal strength, where the information about the locations of the M antenna panels is used to indicate the locations of the M antenna panels on the first terminal, P is an integer multiple of M, and M and P are positive integers.

Based on the foregoing technical solution, for the second terminal, the antenna panel used by the first terminal to send the synchronization signal block with the greatest signal strength is an antenna panel closest to the second terminal in a plurality of antenna panels used by the first terminal to send the synchronization signal blocks. Therefore, the second terminal can determine a relative orientation of the second terminal to the first terminal by using the information about the location of the antenna panel used by the first terminal to send the synchronization signal block with the greatest signal strength.

P is equal to M, and information about a location of one of the M antenna panels of the first terminal corresponds to one of the M synchronization signal blocks. Alternatively, P is at least twice greater than M, and information about a location of one of the M antenna panels of the first terminal corresponds to at least two of the P synchronization signal blocks.

In embodiments of a possible design, the synchronization signal block is used to indicate information about a location of an antenna panel that sends the synchronization signal block.

In embodiments of a possible design, the synchronization signal block includes a primary synchronization signal, a secondary synchronization signal, and a physical broadcast channel.

In embodiments of a possible design, the correspondence between the information about the locations of the M antenna panels and the P synchronization signal blocks of the first terminal includes: a correspondence between the information about the locations of the M antenna panels and P resource mapping modes, where the resource mapping mode is used to indicate a location of a time-frequency resource occupied by the primary synchronization signal and a location of a time-frequency resource occupied by the secondary synchronization signal in the synchronization signal block. In this way, synchronization signal blocks corresponding to the antenna panels at different locations on the first terminal use different resource mapping modes, so that the synchronization signal blocks corresponding to the antenna panels at different locations on the first terminal are constructed differently, and the antenna panels at different locations on the first terminal correspond to different synchronization signal blocks.

In embodiments of a possible design, the correspondence between the information about the locations of the M antenna panels and the P synchronization signal blocks includes a correspondence between the information about the locations of the M antenna panels and sequences of P secondary synchronization signals. In this way, the sequences of the secondary synchronization signals corresponding to the antenna panels at different locations on the first terminal are different, so that the antenna panels at different locations on the first terminal correspond to different synchronization signal blocks.

In embodiments of a possible design, a sequence of the secondary synchronization signal is generated according to the following formula: $c(n)=(x_0(n+i_1+k)+x_1(n+i_2+l)) \mod 2$, where $c(n)$ is the sequence of the secondary synchronization signal, where n is an integer greater than or equal to 0 and less than or equal to 126;

$$i_1 = \left(3 \times \left\lfloor \frac{NID1}{112} \right\rfloor + NID2\right) \times 5,$$

where NID1 is an identifier of a physical cell identifier group, NID1 is an integer greater than or equal to 0 and less than or equal to 335, NID2 is an intra-group identifier of the physical cell identifier group, and a value range of NID2 is {0, 1, 2}; $x_0(n)$ and $x_1(n)$ are both M-sequences; $i_2$=(NID1) mod 112; and k and l are integers, and k and l are determined based on the information about the location of the antenna panel.

According to a third aspect, a synchronization signal block sending apparatus is provided, and includes: a processing module, configured to determine, based on a correspondence between information about locations of M antenna panels and P synchronization signal blocks of the synchronization signal block sending apparatus and information about locations of N antenna panels, a synchronization signal block corresponding to each of the N antenna panels, where the information about the locations of the M antenna panels is used to indicate the locations of the M antenna panels on the synchronization signal block sending apparatus, the N antenna panels are included in the M antenna panels, N is less than or equal to M, M, N and P are positive integers, and P is an integer multiple of M; and a sending module, configured to separately send, by using each of the N antenna panels, the synchronization signal block corresponding to each of the N antenna panels.

P is equal to M, and information about a location of one of the M antenna panels of the synchronization signal block sending apparatus corresponds to one of the M synchronization signal blocks. Alternatively, P is at least twice greater than M, and information about a location of one of the M antenna panels of the synchronization signal block sending apparatus corresponds to at least two of the P synchronization signal blocks.

In embodiments of a possible design, the synchronization signal block is used to indicate information about a location of an antenna panel that sends the synchronization signal block.

In embodiments of a possible design, the synchronization signal block includes a primary synchronization signal, a secondary synchronization signal, and a physical broadcast channel.

In embodiments of a possible design, the correspondence between the information about the locations of the M antenna panels and the P synchronization signal blocks includes: a correspondence between the information about the locations of the M antenna panels and P resource mapping modes, where the resource mapping mode is used to indicate a location of a time-frequency resource occupied by the primary synchronization signal and a location of a time-frequency resource occupied by the secondary synchronization signal in the synchronization signal block.

In embodiments of a possible design, the correspondence between the information about the locations of the M antenna panels and the P synchronization signal blocks includes a correspondence between the information about the locations of the M antenna panels and sequences of P secondary synchronization signals.

In embodiments of a possible design, a sequence of a secondary synchronization signal is generated according to the following formula: $c(n)=(x_0(n+i_1+k)+x_1(n+i_2+l)) \bmod 2$, where c(n) is the sequence of the secondary synchronization signal, where n is an integer greater than or equal to 0 and less than or equal to 126;

$$i_1 = \left(3 \times \left\lfloor \frac{NID1}{112} \right\rfloor + NID2\right) \times 5,$$

where NID1 is an identifier of a physical cell identifier group, NID1 is an integer greater than or equal to 0 and less than or equal to 335, NID2 is an intra-group identifier of the physical cell identifier group, and a value range of NID2 is $\{0, 1, 2\}$; $x_0(n)$ and $x_1(n)$ are both M-sequences; $i_2=(NID1) \bmod 112$; and k and l are integers, and k and l are determined based on the information about the location of the antenna panel.

According to a fourth aspect, a synchronization signal block sending apparatus is provided, including a processor. The processor is configured to be coupled to a memory, read instructions in the memory, and implement the synchronization signal block sending method in any one of the first aspect according to the instructions.

Optionally, the synchronization signal block sending apparatus provided in the third aspect and the fourth aspect may be a terminal or a part of a terminal, for example, a chip, a chip system, or a circuit structure. This is not limited in this application.

According to a fifth aspect, a computer-readable storage medium is provided. The computer-readable storage medium stores instructions. When the instructions are run on a terminal, the terminal is enabled to perform the synchronization signal block sending method according to any one of the first aspect.

According to a sixth aspect, a computer program product including instructions is provided. When the computer program product runs on a terminal, the terminal is enabled to perform the synchronization signal block sending method in any one of the first aspect.

According to a seventh aspect, a chip system is provided. The chip system includes a processor, configured to support a terminal in implementing functions involved in the first aspect. In a possible design, the chip system further includes a memory. The memory is configured to store program instructions and data that are necessary for the terminal. The chip system may include a chip, or may include a chip and another discrete device.

For technical effects brought by embodiments of any design manner of the third to the seventh aspects, refer to the technical effects brought by different design manners of the first aspect. Details are not described herein again.

According to an eighth aspect, a synchronization signal block receiving apparatus is provided, and includes: a receiving module, configured to receive a plurality of synchronization signal blocks; and a processing module, configured to: determine a synchronization signal block with the greatest signal strength from the plurality of synchronization signal blocks; and determine, based on a correspondence between information about locations of M antenna panels and P synchronization signal blocks of a synchronization signal block sending apparatus, information about a location of an antenna panel used by the synchronization signal block sending apparatus to send the synchronization signal block with the greatest signal strength, where the information about the locations of the M antenna panels is used to indicate the locations of the M antenna panels on the synchronization signal block sending apparatus, P is an integer multiple of M, and M and P are positive integers.

P is equal to M, and information about a location of one of the M antenna panels of the synchronization signal block sending apparatus corresponds to one of the M synchronization signal blocks. Alternatively, P is at least twice greater than M, and information about a location of one of the M antenna panels of the synchronization signal block sending apparatus corresponds to at least two of the P synchronization signal blocks.

In embodiments of a possible design, the synchronization signal block is used to indicate information about a location of an antenna panel that sends the synchronization signal block.

In embodiments of a possible design, the synchronization signal block includes a primary synchronization signal, a secondary synchronization signal, and a physical broadcast channel.

In embodiments of a possible design, the correspondence between the information about the locations of the M antenna panels and the P synchronization signal blocks of the first terminal includes: a correspondence between the information about the locations of the M antenna panels and P resource mapping modes, where the resource mapping mode is used to indicate a location of a time-frequency resource occupied by the primary synchronization signal and a location of a time-frequency resource occupied by the secondary synchronization signal in the synchronization signal block.

In embodiments of a possible design, the correspondence between the information about the locations of the M antenna panels and the P synchronization signal blocks includes a correspondence between the information about the locations of the M antenna panels and sequences of P secondary synchronization signals.

In embodiments of a possible design, a sequence of a secondary synchronization signal is generated according to the following formula: $c(n)=(x_0(n+i_1+k)+x_1(n+i_2+l)) \bmod 2$, where c(n) is the sequence of the secondary synchronization signal, where n is an integer greater than or equal to 0 and less than or equal to 126;

$$i_1 = \left(3 \times \left\lfloor \frac{NID1}{112} \right\rfloor + NID2\right) \times 5,$$

where NID1 is an identifier of a physical cell identifier group, NID1 is an integer greater than or equal to 0 and less than or equal to 335, NID2 is an intra-group identifier of the physical cell identifier group, and a value range of NID2 is $\{0, 1, 2\}$; $x_0(n)$ and $x_1(n)$ are both M-sequences; $i_2=(NID1)$ mod 112; and k and l are integers, and k and l are determined based on the information about the location of the antenna panel.

According to a ninth aspect, a synchronization signal block receiving apparatus is provided, including a processor. The processor is configured to be coupled to a memory, read instructions in the memory, and implement the synchronization signal block receiving method in any one of the second aspect according to the instructions.

Optionally, the synchronization signal block receiving apparatus provided in the eighth aspect and the ninth aspect may be a terminal or a part of a terminal, for example, a chip, a chip system, or a circuit structure. This is not limited in this application.

According to a tenth aspect, a computer-readable storage medium is provided. The computer-readable storage medium stores instructions. When the instructions are run on a terminal, the terminal is enabled to perform the synchronization signal block receiving method according to any one of the second aspect.

According to an eleventh aspect, a computer program product including instructions is provided. When the computer program product runs on a terminal, the terminal is enabled to perform the synchronization signal block receiving method in any one of the second aspect.

According to a twelfth aspect, a chip system is provided. The chip system includes a processor, configured to support a terminal in implementing functions involved in the second aspect. In a possible design, the chip system further includes a memory. The memory is configured to store program instructions and data that are necessary for the terminal. The chip system may include a chip, or may include a chip and another discrete device.

For technical effects brought by embodiments of any design manner of the eighth to the twelfth aspects, refer to the technical effects brought by different design manners of the second aspect. Details are not described herein again.

According to a thirteenth aspect, a communication system is provided. The communication system includes a first terminal and a second terminal, and the first terminal is configured to perform the synchronization signal block sending method according to any one of the first aspect, and the second terminal is configured to perform the synchronization signal block receiving method according to any one of the second aspect.

DESCRIPTION OF EMBODIMENTS

The following first briefly describes related concepts in embodiments of this application.

Figure 1:
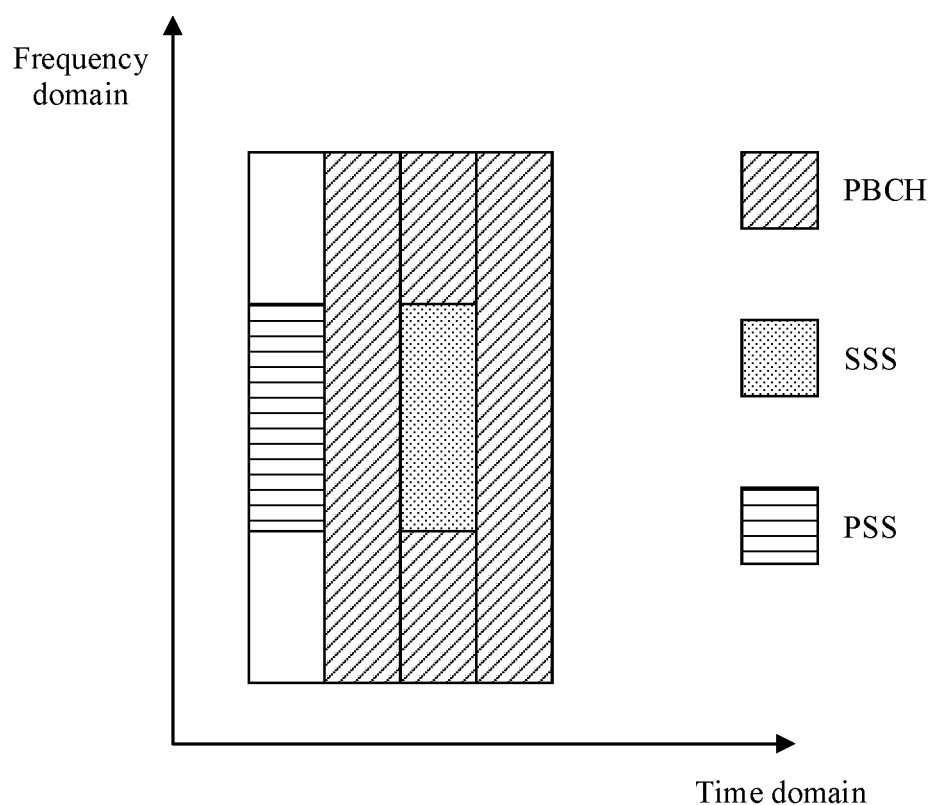
FIG. 1 is a schematic structural diagram of a synchronization signal block.

FIG. 1 is a schematic structural diagram of a synchronization signal block. A synchronization signal block is a signal structure, and includes a primary synchronization signal (PSS), a secondary synchronization signal (SSS), and a physical broadcast channel (PBCH). It should be noted that the synchronization signal block usually occupies four orthogonal frequency division multiplexing (OFDM) symbols. The primary synchronization signal and the secondary synchronization signal are used to assist a terminal in identifying a cell and performing synchronization with the cell. The PBCH includes most basic system information, such as a system frame number and intra-frame timing information.

Currently, a sequence of the secondary synchronization signal is generated according to the following formula (1):

$$c(n)=(x_0(n+i_1)+x_1(n+i_2)) \bmod 2 \tag{1}$$

$c(n)$ is the sequence of the secondary synchronization signal, where n is an integer greater than or equal to 0 and less than or equal to 126.

$$i_1 = \left(3 \times \left\lfloor \frac{NID1}{112} \right\rfloor + NID2\right) \times 5, \text{ and } i_2 = (NID1) \bmod 112.$$

NID1 is an identifier of a physical cell identifier group, and NID1 is an integer greater than or equal to 0 and less than or equal to 335. NID2 is an intra-group ID of the physical cell identifier group, and a value range of NID2 is {0, 1, 2}. It should be noted that, $N_{cell}=3*NID1+NID2$, where $N_{cell}$ is a physical cell identifier (physical cell identifier, PCI).

$x_0(n)$ and $x_1(n)$ are both M-sequences. It should be noted that the M-sequence is a pseudo-random-sequence generated by using a linear feedback shift register (LFSR). There is a unique M-sequence corresponding to a determined LFSR with a given initial value. Therefore, a transmit end generates M-sequences by using different initial values, and a receive end may uniquely determine the M-sequence through sequence detection.

A used shift register in $x_0(n)$ is: $x_0(i+7)=(x_0(i+4)+x_0(i))$ mod 2, where initial values are: $x_0(0)=0$, $x_0(1)=0$, $x_0(2)=0$, $x_0(3)=0$, $x_0(4)=0$, $x_0(5)=0$, and $x_0(6)=1$.

A used shift register in $x_1(n)$ is: $x_1(i+7)=(x_1(i+1)+x_1(i))$ mod 2, where initial values are: $x_1(0)=0$, $x_1(1)=0$, $x_1(2)=0$, $x_1(3)=0$, $x_1(4)=0$, $x_1(5)=0$, and $x_1(6)=1$.

In descriptions of this application, unless otherwise specified, "/" means "or". For example, A/B may represent A or B. The term "and/or" in this specification describes only an association relationship for associated objects and represents that three relationships may exist. For example, A and/or B may represent the following three cases: Only A exists, both A and B exist, and only B exists. In addition, "at least one" means one or more, and "a plurality of" means two or more. Words such as "first" and "second" do not limit a quantity and an execution sequence, and the words such as "first" and "second" do not indicate a definite difference.

It should be noted that in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example", "for example", or the like is intended to present a related concept in a specific manner.

The following describes technical solutions in the embodiments of this application with reference to the accompanying drawings in the embodiments of this application.

Figure 2:
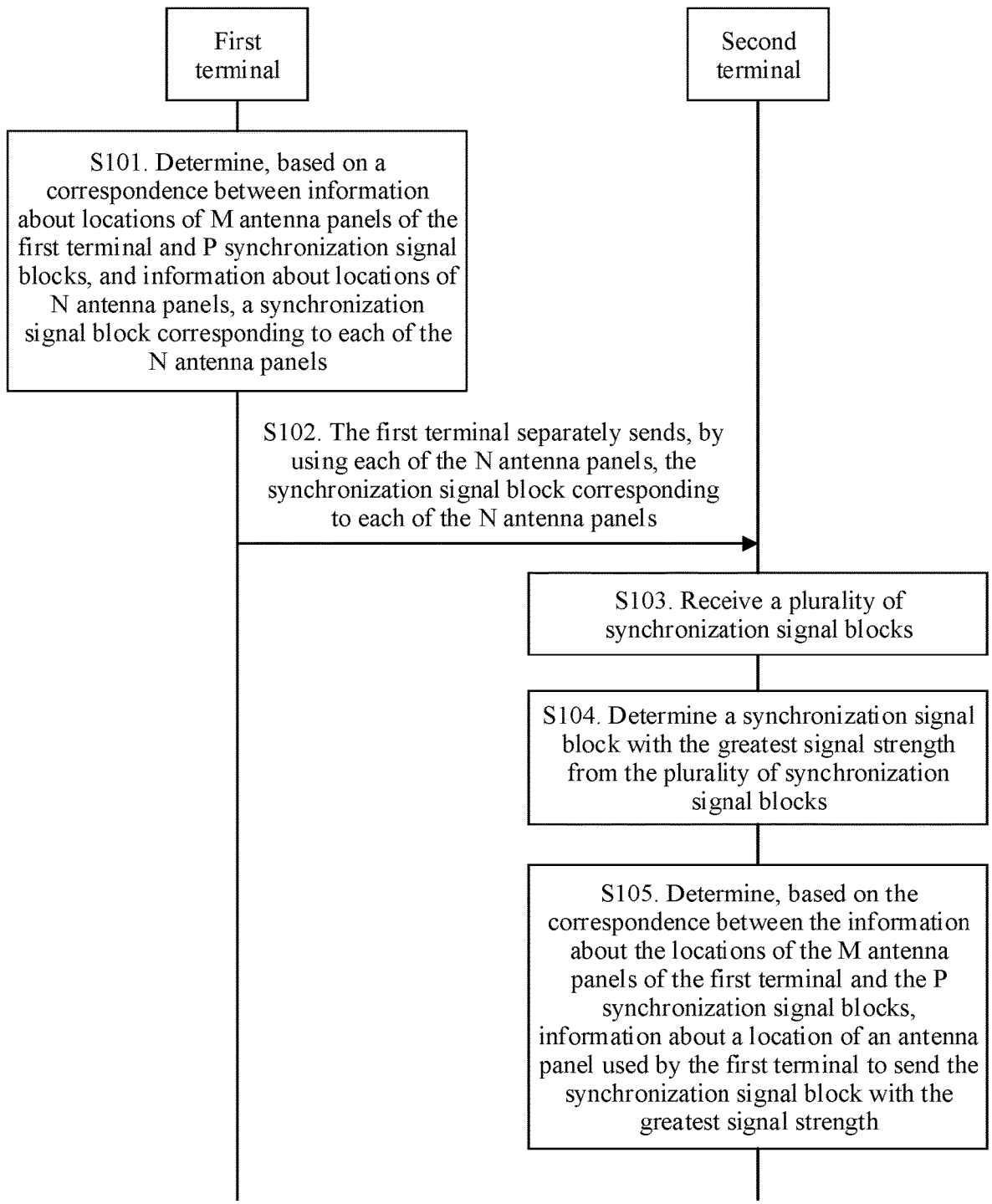
FIG. 2 is a flowchart of a synchronization signal block sending and receiving method according to an embodiment of this application.

FIG. 2 shows a synchronization signal block sending and receiving method according to an embodiment of this application. The method includes the following steps.

S101. A first terminal determines, based on a correspondence between information about locations of M antenna panels and P synchronization signal blocks of the first terminal and information about locations of N antenna panels, a synchronization signal block corresponding to each of the N antenna panels.

The M antenna panels are configured for the first terminal, where M is a positive integer. The M antenna panels are deployed on different parts of the first terminal, for example, a front bumper, a rear bumper, and the top of a vehicle. It may be understood that the N antenna panels are included in the M panels. In other words, the N antenna panels are all or a part of the M antenna panels of the first terminal. N is less than or equal to M, P is an integer multiple of M, and M, N and P are positive integers.

It may be understood that P is equal to M, and information about a location of one of the M antenna panels of the first terminal corresponds to one of the M synchronization signal blocks. Alternatively, P is at least twice greater than M, and information about a location of one of the M antenna panels of the first terminal corresponds to at least two of the P synchronization signal blocks.

In this embodiment of this application, the information about the locations of the M antenna panels is used to indicate the locations of the M antenna panels on the first terminal. Optionally, the information about the location of the antenna panel may be a location index, a location identifier, or the like. For example, the information about the location of the antenna panel is a location index. For the location indexes of the antenna panels, refer to Table 1.

TABLE 1

| Location index | Location of an antenna panel on the first terminal |
| --- | --- |
| 00 | The antenna panel is on the front bumper of the first terminal. |
| 01 | The antenna panel is on the rear bumper of the first terminal. |
| 10 | The antenna panel is on the left side of the vehicle body of the first terminal. |
| 11 | The antenna panel is on the right side of the vehicle body of the first terminal. |
| . . . | . . . |

In this embodiment of this application, the M antenna panels of the first terminal are configured to cover different sectors. It may be understood that the antenna panel on the front bumper of the first terminal can cover only a front area of the vehicle, but cannot cover a rear area of the vehicle. The antenna panel on the right side of the vehicle body of the first terminal can cover only an area on the right side of the vehicle body, but cannot cover an area on the left side of the vehicle body. In this way, in actual application, to ensure a coverage effect, a sector covered by the antenna panel is determined by a location of the antenna panel on the first terminal. That is, there is a correspondence between a sector covered by an antenna panel and information about a location of the antenna panel. In other words, information about a location of an antenna panel is further used to implicitly indicate a sector covered by the antenna panel. Optionally, the correspondence between the sector covered by the antenna panel and the sector covered by the antenna panel is preconfigured, or is specified in a standard.

For example, in a polar coordinate system in which the first terminal is used as a pole and a vehicle head direction is used as a polar axis, the antenna panel on the front bumper of the first terminal is responsible for covering a sector from 45° to 315°, the antenna panel on the right side of the vehicle body of the first terminal is responsible for covering a sector from 45° to 135°, the antenna panel on the rear bumper of the first terminal is responsible for a sector from 135° to 225°, and the antenna panel on the right side of the vehicle body of the first terminal is responsible for covering a sector from 225° to 315°.

Figure 3:
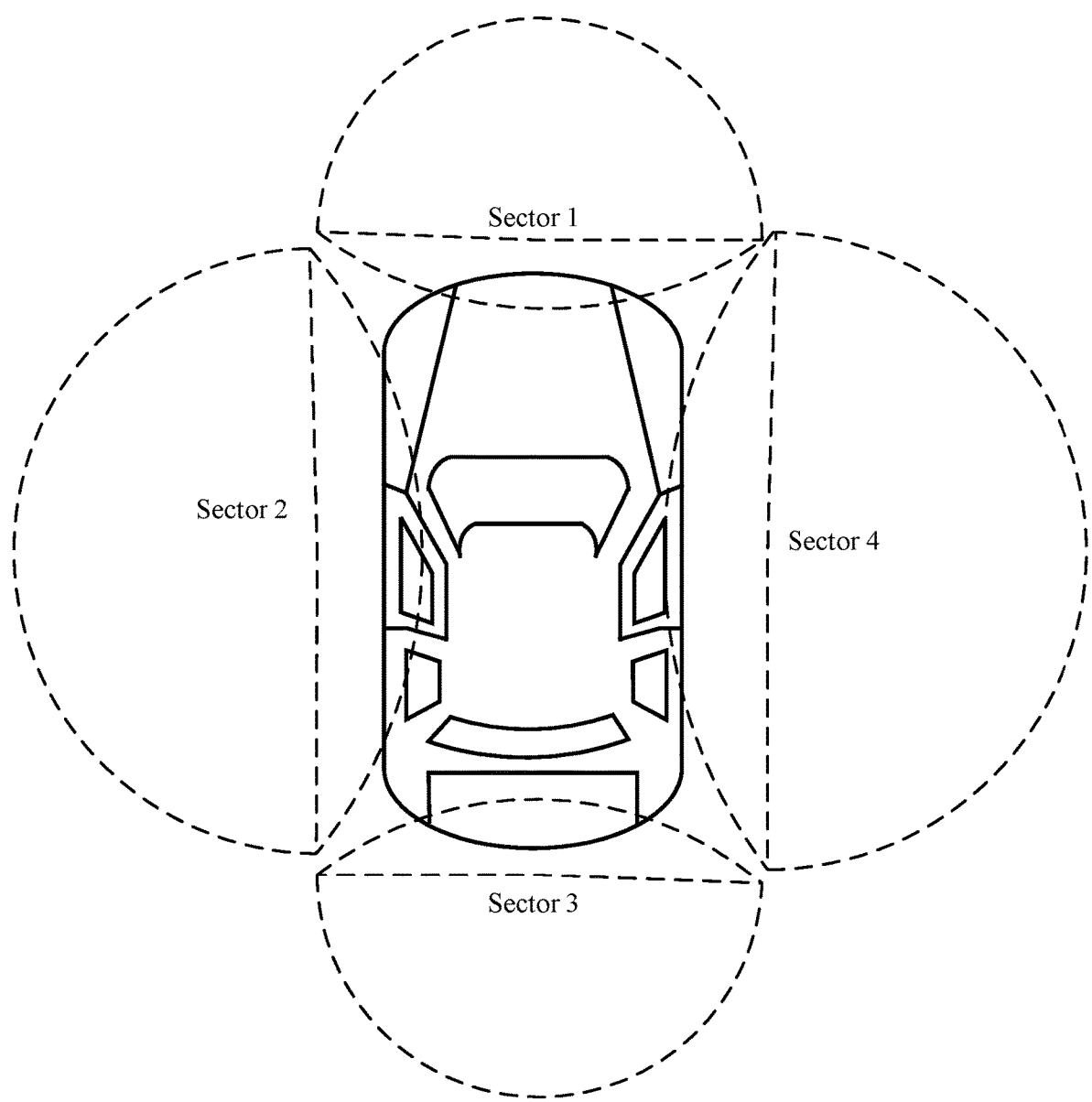
FIG. 3 is a schematic diagram of sectors covered by antenna panels on a first terminal according to an embodiment of this application.

For another example, descriptions are provided with reference to FIG. 3. The antenna panel on the front bumper of the first terminal is responsible for a sector 1, the antenna panel on the left side of the vehicle body of the first terminal is responsible for a sector 2, the antenna panel on the rear bumper of the first terminal is responsible for a sector 3, and the antenna panel on the right side of the vehicle body of the first terminal is responsible for a sector 4.

In this embodiment of this application, there is a correspondence between information about a location of an antenna panel and a synchronization signal block. The correspondence between the information about the location of the antenna panel and the synchronization signal block may be preconfigured on the first terminal and/or a second terminal, determined through negotiation between the first terminal and a second terminal, or specified in a standard.

Because there is the correspondence between the information about the location of the antenna panel and the synchronization signal block, antenna panels at different locations on the first terminal correspond to different synchronization signal blocks. In other words, the synchronization signal block may be used to indicate the information about the location of the antenna panel that sends the synchronization signal block.

In an implementation, the synchronization signal block explicitly indicates the information about the location of the antenna panel that sends the synchronization signal block. Optionally, a PBCH in the synchronization signal block carries the information about the location of the antenna panel that sends the synchronization signal block.

In another implementation, the synchronization signal block implicitly indicates the information about the location of the antenna panel that sends the synchronization signal block. In this case, the correspondence between the information about the locations of the M antenna panels and the P synchronization signal blocks includes one or any combination of the following cases.

Case 1: There is a correspondence between the information about the locations of M antenna panels and P resource mapping modes. The resource mapping mode is used to indicate a location of a time-frequency resource occupied by a primary synchronization signal and a location of a time-frequency resource occupied by a secondary synchronization signal in the synchronization signal block. It should be noted that the resource mapping mode may have different names, for example, a resource pattern. This is not limited in this embodiment of this application.

If P is equal to M, information about a location of one of the M antenna panels of the first terminal corresponds to one of the P resource mapping modes. Alternatively, if P is at least twice greater than M, information about a location of one of the M antenna panels of the first terminal corresponds to at least two of the P resource mapping modes.

It may be understood that because there is a correspondence between information about a location of an antenna panel and a resource mapping mode, antenna panels at different locations on the first terminal correspond to different resource mapping modes. In other words, synchronization signal blocks sent by antenna panels at different locations on the first terminal use different resource mapping modes. Therefore, the synchronization signal blocks sent by the antenna panels at the different locations on the first terminal are constructed differently, so that synchronization signal blocks sent by the antenna panels at different locations on the first terminal are different.

It should be noted that, that synchronization signal blocks using different resource mapping modes are constructed differently includes the following two cases.

Case (1): If the synchronization signal blocks use different resource mapping modes, locations of a time-frequency resource occupied by a primary synchronization signal and a time-frequency resource occupied by a secondary synchronization signal in a synchronization signal block are different from those in another synchronization signal block.

Figure 4:
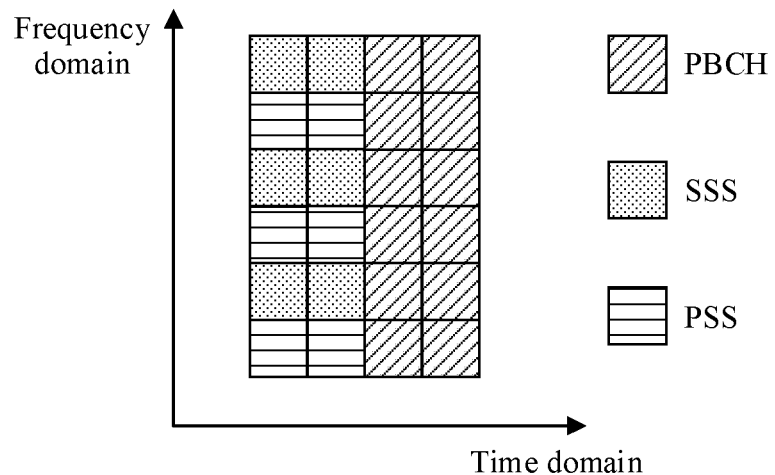
FIG. 4 is a schematic diagram of a mapping mode 1 according to an embodiment of this application.
Figure 5:
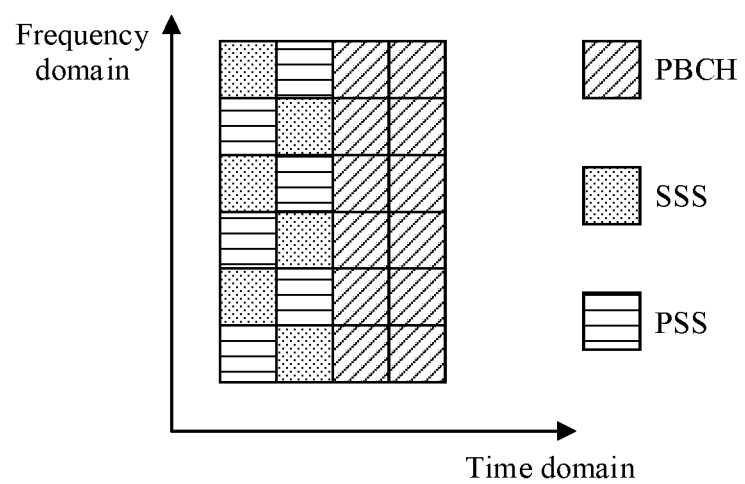
FIG. 5 is a schematic diagram of a mapping mode 2 according to an embodiment of this application.
Figure 6:
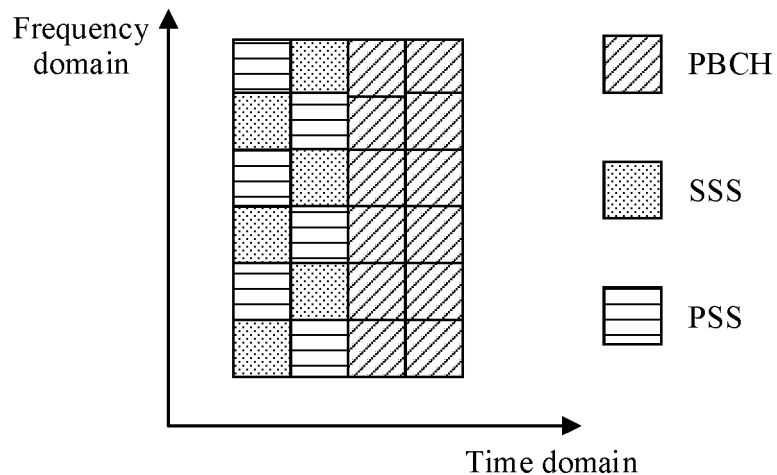
FIG. 6 is a schematic diagram of a mapping mode 3 according to an embodiment of this application.
Figure 7:
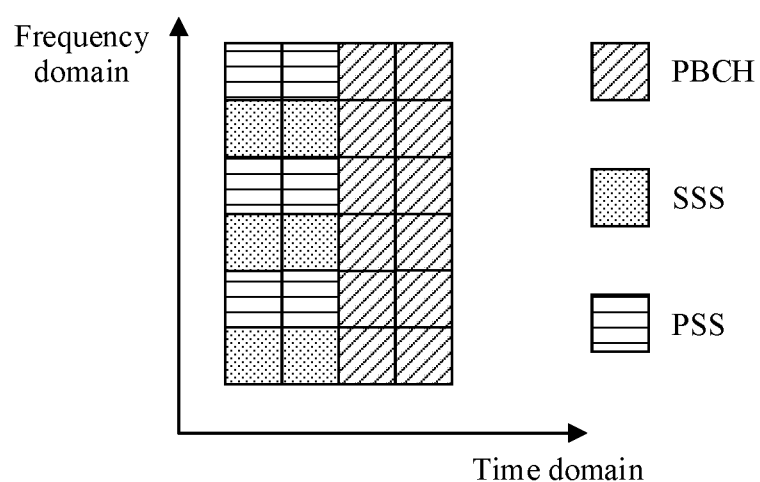
FIG. 7 is a schematic diagram of a mapping mode 4 according to an embodiment of this application.

The following describes the foregoing case (1) by using an example. For example, the information about the location of the antenna panel is a location index, and P is equal to M. For a correspondence between a location index of an antenna panel and a resource mapping mode, refer to Table 2. For example, for a resource mapping mode 1, refer to FIG. 4. For a resource mapping mode 2, refer to FIG. 5. For a resource mapping mode 3, refer to FIG. 6. For a resource mapping mode 4, refer to FIG. 7.

TABLE 2

| Location index of an antenna panel | Resource mapping mode |
| --- | --- |
| 00 | Resource mapping mode 1 |
| 11 | Resource mapping mode 2 |
| 01 | Resource mapping mode 3 |

TABLE 2-continued

| Location index of an antenna panel | Resource mapping mode |
| --- | --- |
| 10 | Resource mapping mode 4 |
| ... | ... |

For example, the information about the location of the antenna panel is a location index, and P is twice greater than M. For a correspondence between a location index of an antenna panel and a resource mapping mode, refer to Table 3.

TABLE 3

| Location index of an antenna panel | Resource mapping mode |
| --- | --- |
| 00 | Resource mapping mode 1 |
| 00 | Resource mapping mode 2 |
| 01 | Resource mapping mode 3 |
| 01 | Resource mapping mode 4 |
| ... | ... |

Case (2): If the synchronization signal blocks use different resource mapping modes, a time domain resource occupied by a primary synchronization signal and a time domain resource occupied by a secondary synchronization signal in a synchronization signal block are different from those in another synchronization signal block.

Optionally, in this case, the correspondence between the information about the locations of the M antenna panels and the P resource mapping modes includes a correspondence between the information about the locations of the M antenna panels and time domain offsets of P primary synchronization signals, and/or a correspondence between the information about the locations of the M antenna panels and time domain offsets of P secondary synchronization signals. The time domain offset of the primary synchronization signal is an offset between an OFDM symbol occupied by the primary synchronization signal in the synchronization signal block and an initial OFDM symbol of the synchronization signal block. The time domain offset of the secondary synchronization signal is an offset between an OFDM symbol occupied by the secondary synchronization signal in the synchronization signal block and an initial OFDM symbol of the synchronization signal block.

For example, the information about the location of the antenna panel is a location index, and P is equal to M. For a correspondence between information about a location of an antenna panel and a time domain offset of a primary synchronization signal in a synchronization signal block, and a correspondence between information about a location of an antenna panel and a time domain offset of a secondary synchronization signal in a synchronization signal block, refer to Table 4.

TABLE 4

| Location index of an antenna panel | Time domain offset of a primary synchronization signal | Time domain offset of a secondary synchronization signal |
| --- | --- | --- |
| 00 | 1 | 0 |
| 11 | 1 | 2 |
| 01 | 3 | 1 |
| 10 | 0 | 2 |
| ... | ... | ... |

Figure 8:
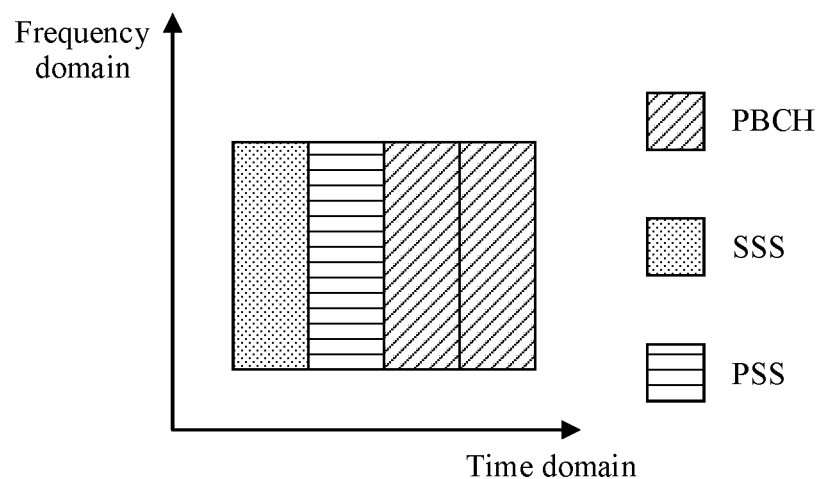
FIG. 8 is a schematic diagram of a mapping mode according to an embodiment of this application.
Figure 9:
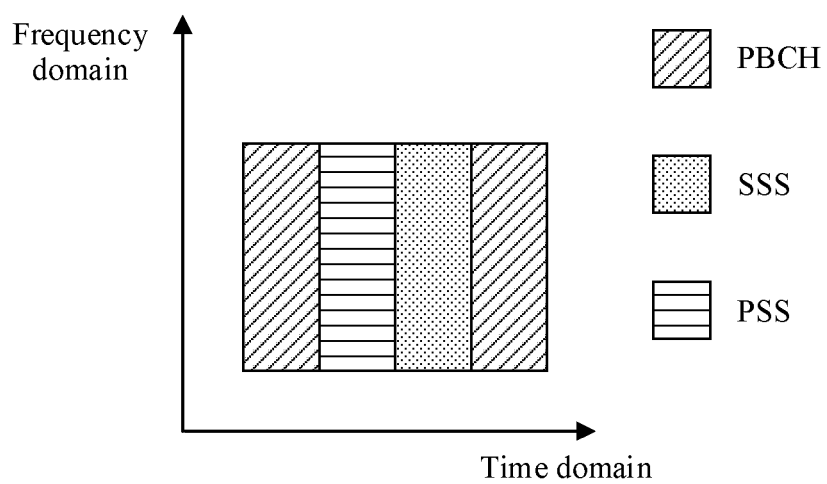
FIG. 9 is a schematic diagram of another mapping mode according to an embodiment of this application.
Figure 10:
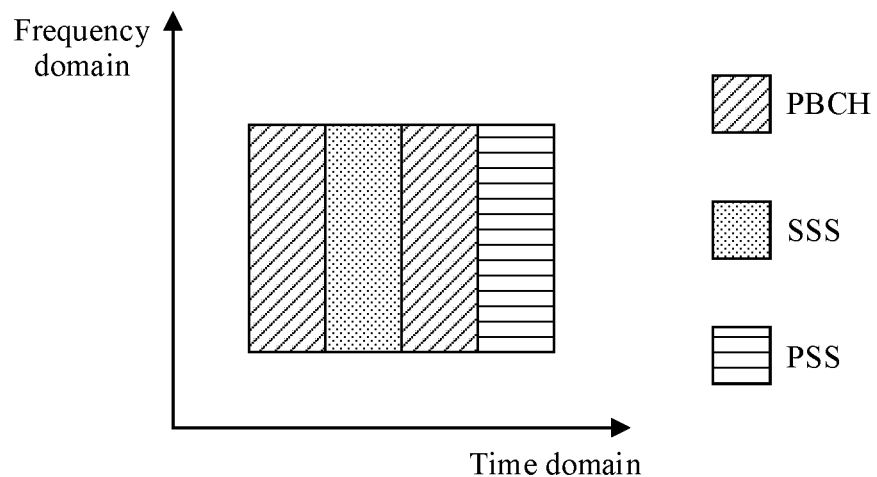
FIG. 10 is a schematic diagram of another mapping mode according to an embodiment of this application.
Figure 11:
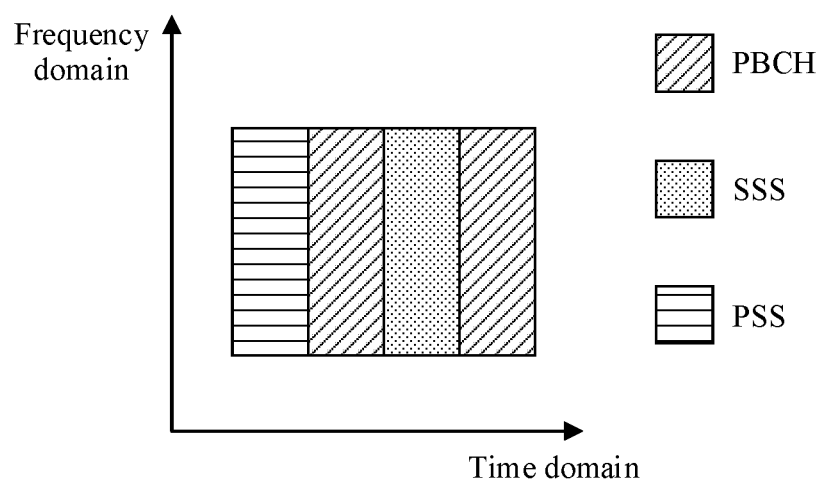
FIG. 11 is a schematic diagram of another mapping mode according to an embodiment of this application.

For example, with reference to Table 3, for a resource mapping mode corresponding to an antenna panel whose location index is 00, refer to FIG. 8. For a resource mapping mode corresponding to an antenna panel whose location index is 11, refer to FIG. 9. For a resource mapping mode corresponding to an antenna panel whose location index is 01, refer to FIG. 10. For a resource mapping mode corresponding to an antenna panel whose location index is 10, refer to FIG. 11.

It may be understood that the resource mapping modes shown in FIG. 4 to FIG. 11 are merely examples provided in the embodiments of this application, and constitute no limitation.

Case (2): There is a correspondence between the information about the locations of the M antenna panels and sequences of P secondary synchronization signals.

If P is equal to M, information about a location of one of the M antenna panels of the first terminal corresponds to a sequence of one secondary synchronization signal in the sequences of the P secondary synchronization signals. Alternatively, if P is at least twice greater than M, information about a location of one of the M antenna panels of the first terminal corresponds to sequences of at least two secondary synchronization signals in the sequences of the P secondary synchronization signals.

It may be understood that because there is a correspondence between information about a location of an antenna panel and a sequence of a secondary synchronization signal, antenna panels at different locations on the first terminal correspond to different sequences of secondary synchronization signals, so that the antenna panels at different locations on the first terminal correspond to different synchronization signal blocks.

In an implementation, a sequence of a secondary synchronization signal is generated according to the following formula (2):

$$c(n)=(x_0(n+i_1+k)+x_1(n+i_2+l)) \bmod 2 \quad (2)$$

c(n) is the sequence of the secondary synchronization signal, where n is a positive integer greater than or equal to 0 and less than or equal to 126.

$$i_1 = \left(3 \times \left\lfloor \frac{NID1}{112} \right\rfloor + NID2\right) \times 5, \text{ and } i_2 = (NID1) \bmod 112.$$

NID1 is an identifier of a physical cell identifier group, and NID1 is an integer greater than or equal to 0 and less than or equal to 335. NID2 is an intra-group ID of a physical cell identifier group, and a value range of NID2 is {0, 1, 2}.

$x_0(n)$ and $x_1(n)$ are both M-sequences. For $x_0(n)$ and $x_1(n)$, refer to the foregoing descriptions. Details are not described herein again.

k is a first cyclic displacement parameter, and l is a second cyclic displacement parameter. Both k and l are integers, and k and l are determined based on the information about the location of the antenna panel. For example, k and l are determined based on a correspondence between the information about the location of the antenna panel, k, and l.

For example, the information about the location of the antenna panel is a location index, and P is equal to M. For a correspondence between k, l, and the location index of the antenna panel, refer to Table 5.

TABLE 5

| Location index of an antenna panel | k | l |
|---|---|---|
| 00 | 1 | 2 |
| 11 | 3 | 4 |

TABLE 5-continued

| Location index of an antenna panel | k | l |
|---|---|---|
| 01 | 2 | 3 |
| 10 | 1 | 4 |
| ... | ... | ... |

For example, the information about the location of the antenna panel is a location index, and P is twice greater than M. For a correspondence between k, l, and the location index of the antenna panel, refer to Table 6.

TABLE 6

| Location index of an antenna panel | k | l |
|---|---|---|
| 00 | 1 | 2 |
| 00 | 3 | 4 |
| 11 | 2 | 3 |
| 11 | 1 | 4 |
| 10 | 3 | 4 |
| 10 | 4 | 3 |
| 01 | 5 | 6 |
| 01 | 6 | 5 |
| ... | ... | ... |

The following describes, by using an example, a scenario in which Case (1) and Case (2) are combined. For example, P is equal to M. For a correspondence between information about a location of an antenna panel and a synchronization signal block, refer to Table 7.

TABLE 7

| Location index of an antenna panel | Resource mapping mode | k | l |
|---|---|---|---|
| 000 | Resource mapping mode 1 | 1 | 2 |
| 001 | Resource mapping mode 1 | 3 | 4 |
| 010 | Resource mapping mode 2 | 1 | 2 |
| 011 | Resource mapping mode 2 | 3 | 4 |
| 100 | Resource mapping mode 3 | 1 | 2 |
| ... | ... | ... | ... |

In other words, for any two antenna panels of the first terminal, resource mapping modes used for synchronization signal blocks corresponding to the two antenna panels are different, and/or sequences of secondary synchronization signals in the synchronization signal blocks corresponding to the two antenna panels are different.

It may be understood that Case (1) and Case (2) are merely examples of the correspondence between the information about the locations of the M antenna panels and the P synchronization signal blocks. This embodiment of this application is not limited thereto.

S102. The first terminal separately sends, by using each of the N antenna panels, the synchronization signal block corresponding to each of the N antenna panels.

It may be understood that, compared with a synchronization signal block sending method in a conventional technology in which N antenna panels form an antenna array to perform beam scanning, in technical solutions provided in this embodiment of this application, because the N antenna panels cover different sectors, the first terminal simultaneously sends, by using each of the N antenna panels, the synchronization signal block corresponding to each of the N antenna panels, so that a beam scanning time period can be reduced, and a transmission delay of the synchronization signal blocks can be reduced.

For example, it is assumed that the antenna panel on the front bumper of the first terminal corresponds to a synchronization signal block 1, the antenna panel on the rear bumper of the first terminal corresponds to a synchronization signal block 2, the antenna panel on the left side of the vehicle body of the first terminal corresponds to a synchronization signal block 3, and the antenna panel on the right side of the vehicle body of the first terminal corresponds to a synchronization signal block 4. Therefore, the first terminal sends the synchronization signal block 1 by using the antenna panel on the front bumper, sends the synchronization signal block 2 by using the antenna panel on the rear bumper, sends the synchronization signal block 3 on the antenna panel on the left side of the vehicle body, and sends the synchronization signal block 4 on the antenna panel on the right side of the vehicle body.

Optionally, for any one of the N antenna panels, the first terminal sends, by using the antenna panel, a synchronization signal block in a beam scanning manner in a sector covered by the antenna panel.

S103. A second terminal receives a plurality of synchronization signal blocks.

S104. The second terminal determines a synchronization signal block with the greatest signal strength from the plurality of synchronization signal blocks.

Optionally, a signal strength of a synchronization signal block is reference signal received power (RSRP) of a synchronization signal included in the synchronization signal block. The synchronization signal includes a primary synchronization signal and/or a secondary synchronization signal. It may be understood that, in this case, the synchronization signal block with the greatest signal strength is the synchronization signal block including a synchronization signal with the greatest RSRP.

In an implementation, for each of the plurality of synchronization signal blocks, the second terminal determines RSRP of a synchronization signal included in the synchronization signal block. Then, the second terminal determines, from the plurality of synchronization signal blocks, the synchronization signal block including the synchronization signal with the greatest RSRP.

Currently, a signal strength of a synchronization signal block is not limited to RSRP, and may be another parameter. This is not limited in this embodiment of this application.

S105. The second terminal determines, based on the correspondence between the information about the locations of the M antenna panels and the P synchronization signal blocks of the first terminal, information about a location of an antenna panel used by the first terminal to send the synchronization signal block with the greatest signal strength.

It may be understood that the second terminal can indirectly determine a relative location relationship between the second terminal and the first terminal by determining the information about the location of the antenna panel used by the first terminal to send the synchronization signal block with the greatest signal strength.

The following describes step S105 by using an example. In addition, it is assumed that the antenna panel on the front bumper of the first terminal corresponds to the synchronization signal block 1, the antenna panel on the rear bumper of the first terminal corresponds to the synchronization signal block 2, the antenna panel on the left side of the vehicle body of the first terminal corresponds to the synchronization signal block 3, and the antenna panel on the right side of the vehicle body of the first terminal corresponds to the synchronization signal block 4.

Figure 12:
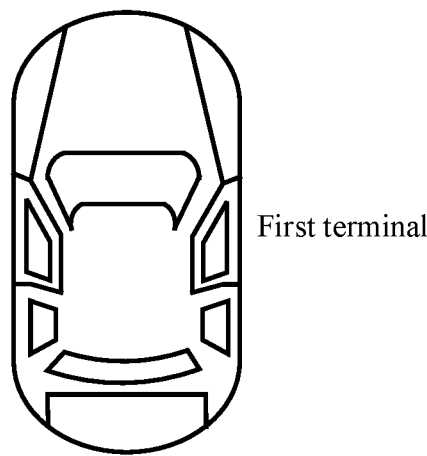
FIG. 12 is a schematic diagram of communication between a first terminal and a second terminal according to an embodiment of this application.
Figure 12:
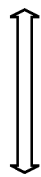
Figure 12:
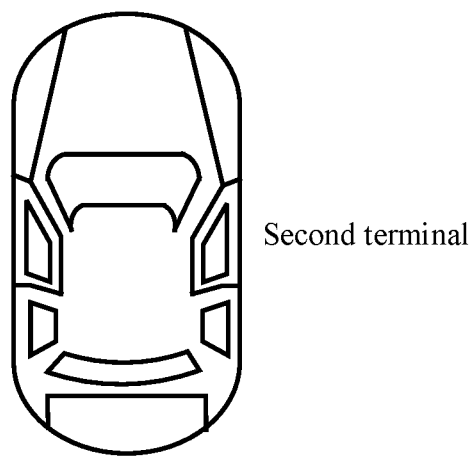

In an example, as shown in FIG. 12, because the second terminal is located behind the first terminal, in the plurality of synchronization signal blocks received by the second terminal, the synchronization signal block 2 is the synchronization signal block with the greatest signal strength. In this way, the second terminal can determine, based on the correspondence between the information about the location of the antenna panel and the synchronization signal block, that the antenna panel that sends the synchronization signal block 2 is the antenna panel on the rear bumper of the first terminal, so that the second terminal can determine that the second terminal is located behind the first terminal.

Figure 13:
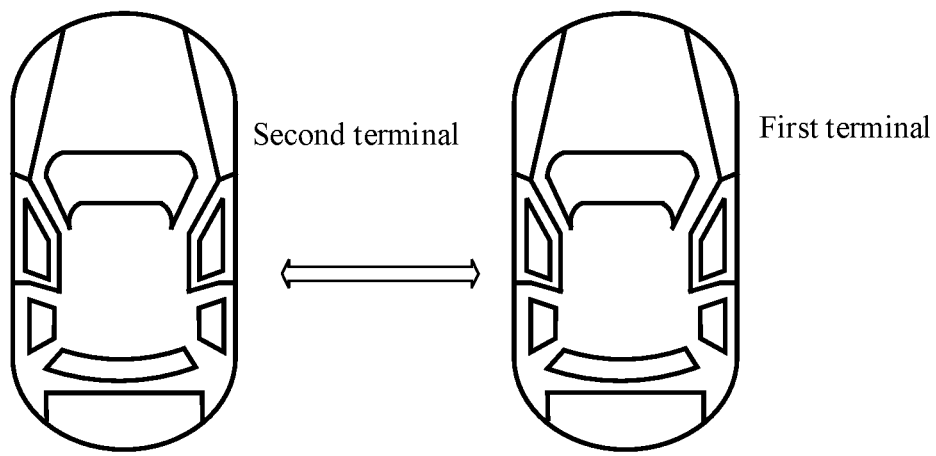
FIG. 13 is another schematic diagram of communication between a first terminal and a second terminal according to an embodiment of this application.

In another example, as shown in FIG. 13, because the second terminal is located on the left side of the first terminal, in the plurality of synchronization signal blocks received by the second terminal, the synchronization signal block 3 is the synchronization signal block with the greatest signal strength. In this way, the second terminal can determine, based on the correspondence between the information about the location of the antenna panel and the synchronization signal block, that the antenna panel that sends the synchronization signal block 2 is the antenna panel on the left side of the vehicle body of the first terminal, so that the second terminal can determine that the second terminal is located on the left side of the first terminal.

Figure 14:
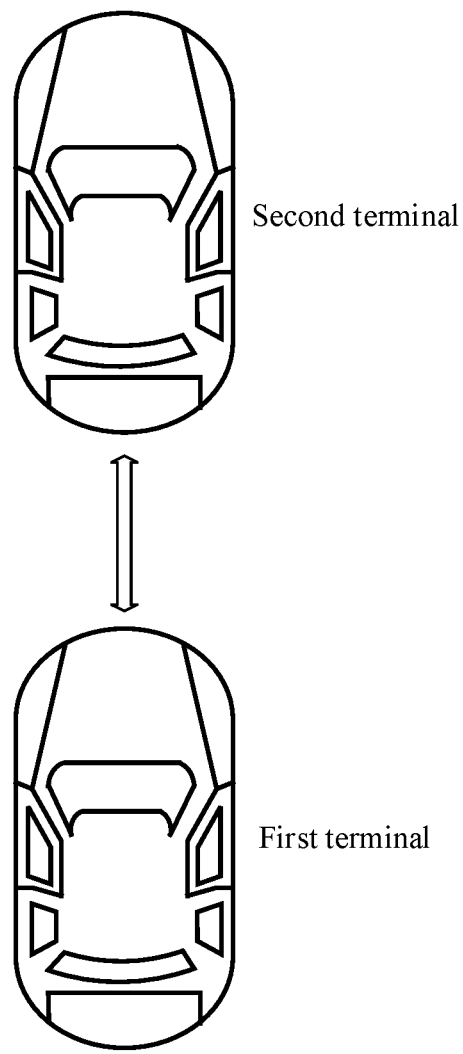
FIG. 14 is another schematic diagram of communication between a first terminal and a second terminal according to an embodiment of this application.

In another example, as shown in FIG. 14, because the second terminal is located in front of the first terminal, in the plurality of synchronization signal blocks received by the second terminal, the synchronization signal block 1 is the synchronization signal block with the greatest signal strength. In this way, the second terminal can determine, based on the correspondence between the information about the location of the antenna panel and the synchronization signal block, that the antenna panel that sends the synchronization signal block 1 is the antenna panel on the front bumper of the first terminal, so that the second terminal can determine that the second terminal is located in front of the first terminal.

In addition, the foregoing method embodiments are mainly described from a V2V scenario, but it does not indicate that the technical solutions provided in this embodiment of this application are applicable only to the V2V scenario. For example, the technical solutions provided in this embodiment of this application may be further applied to a device-to-device (D2D) scenario. This is not limited in this embodiment of this application.

The foregoing mainly describes the solutions provided in the embodiments of this application from a perspective of interaction between the network elements. It may be understood that, to implement the foregoing functions, each network element such as the first terminal or the second terminal includes a corresponding hardware structure and/or software module for implementing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement a described function for each particular application, but it should not be considered that the implementation goes beyond the scope of this application.

Figure 15:
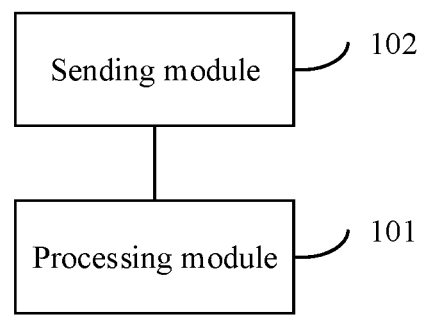
FIG. 15 is a schematic structural diagram of a synchronization signal block sending apparatus according to an embodiment of this application.

FIG. 15 is a schematic structural diagram of a synchronization signal block sending apparatus according to an embodiment of this application. As shown in FIG. 15, the synchronization signal block sending apparatus includes a processing module 101 and a sending module 102. The processing module 101 is configured to support the synchronization signal block sending apparatus in performing step S101 in FIG. 2, and/or another process used for the technical solutions described in this specification. The sending module 102 is configured to support a first terminal in performing step S102 in FIG. 2, and/or another process used for the technical solutions described in this specification. All related content of the steps in the foregoing method embodiments may be cited in function descriptions of the corresponding functional modules. Details are not described herein again.

Figure 16:
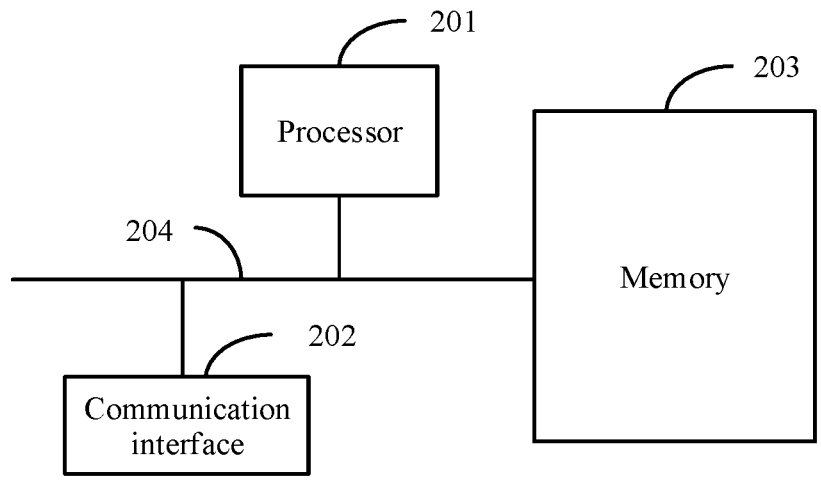
FIG. 16 is a schematic hardware structural diagram of a synchronization signal block sending apparatus according to an embodiment of this application.

The synchronization signal block sending apparatus shown in FIG. 15 may be implemented by using a hardware structure shown in FIG. 16. As shown in FIG. 16, the synchronization signal block sending apparatus includes a processor 201 and a communication interface 202. The processor 201 is configured to support the synchronization signal block sending apparatus in performing step S101 shown in FIG. 2, and/or another process used for the technology described in this specification. The communication interface 202 is configured to support the synchronization signal block sending apparatus in performing step S102 shown in FIG. 2, and/or another process used for the technical solutions described in this specification. In addition, the synchronization signal block sending apparatus may further include a memory 203 and a bus 204.

The processor 201 may be a central processing unit, a general-purpose processor, a digital signal processor, an application-specific integrated circuit, a field programmable gate array or another programmable logic device, a transistor logic device, a hardware component, or any combination thereof. Alternatively, the processor may be a combination of processors implementing a computing function, for example, a combination of one or more microprocessors, or a combination of a digital signal processor and a microprocessor.

The communication interface 202 is configured to communicate with another device or communication network, such as the Ethernet, a radio access network, or a wireless local area network.

The memory 203 may be a read-only memory or another type of static storage device that can store static information and instructions, or a random access memory or another type of dynamic storage device that can store information and instructions; or may be an electrically erasable programmable read-only memory, a compact disc read-only memory or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 203 is not limited thereto. The memory 203 may exist independently, and be connected to the processor 201 by using a bus 204. Alternatively, the memory 203 may be integrated with the processor 201. The memory 203 is configured to store a software program for executing the solutions provided in this embodiment of the present invention, and the processor 201 controls execution of the software program.

The bus 204 may be a peripheral component interconnect bus, an extended industry standard architecture bus, or the like. The bus may be classified into an address bus, a data bus, a control bus, and the like. For ease of representation, only one thick line is used to represent the bus in FIG. 16, but this does not mean that there is only one bus or only one type of bus.

An embodiment of this application further provides a computer-readable storage medium. The computer-readable storage medium stores computer instructions. When the computer-readable storage medium runs on a first terminal, the first terminal is enabled to perform the method shown in FIG. 2. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive (SSD)), or the like.

In the embodiments of this application, the computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner.

An embodiment of this application further provides a chip system. The chip system includes a processor, configured to support a first terminal in implementing the method shown in FIG. 2. In a possible design, the chip system further includes a memory. The memory is configured to store program instructions and data that are necessary for the first terminal. Certainly, the memory may not exist in the chip system. The chip system may include a chip, or may include a chip and another discrete device. This is not specifically limited in this embodiment of this application.

An embodiment of this application further provides a computer program product including computer instructions. When the computer program product runs on a first terminal, the first terminal can perform the method shown in FIG. 2.

The first terminal, the computer storage medium, the chip system, and the computer program product provided in the embodiments of this application are all configured to perform the synchronization signal block sending and receiving method provided above. Therefore, for beneficial effects that can be achieved by the first terminal, the computer storage medium, the chip system, and the computer program product, refer to beneficial effects corresponding to the methods provided above. Details are not described herein again.

Figure 17:
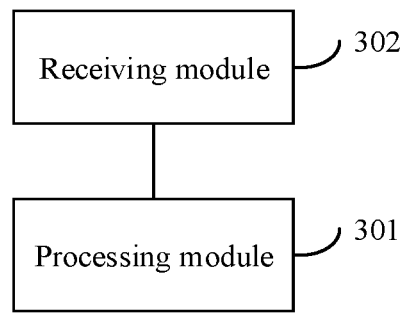
FIG. 17 is a schematic structural diagram of a synchronization signal block receiving apparatus according to an embodiment of this application.

FIG. 17 is a schematic structural diagram of a synchronization signal block receiving apparatus according to an embodiment of this application. As shown in FIG. 17, the synchronization signal block receiving apparatus includes a processing module 301 and a receiving module 302. The processing module 301 is configured to support the synchronization signal block receiving apparatus in performing step S104 and S105 in FIG. 2, and/or another process used for the technical solutions described in this specification. The receiving module 302 is configured to support the synchronization signal block receiving apparatus in performing step S103 in FIG. 2, and/or another process used for the technical solutions described in this specification. All related content of the steps in the foregoing method embodiments may be cited in function descriptions of the corresponding functional modules. Details are not described herein again.

Figure 18:
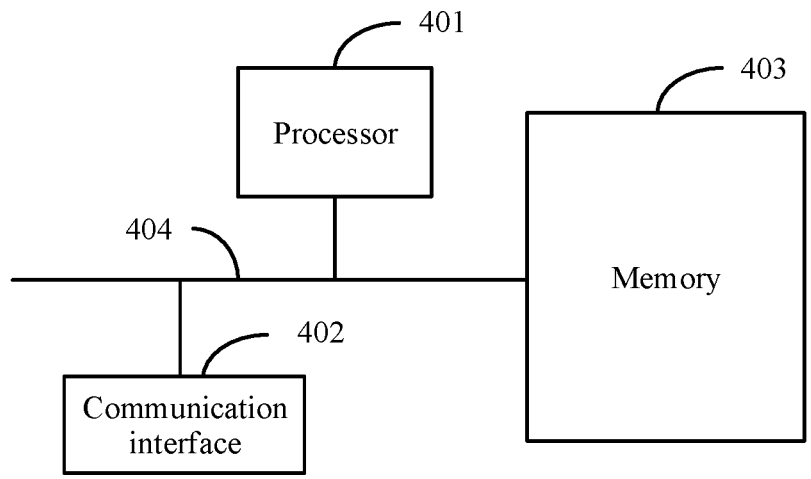
FIG. 18 is a schematic hardware structural diagram of a synchronization signal block receiving apparatus according to an embodiment of this application.

The synchronization signal block receiving apparatus shown in FIG. 17 may be implemented by using a hardware structure shown in FIG. 18. As shown in FIG. 18, the synchronization signal block receiving apparatus includes a processor 401 and a communication interface 402. The processor 401 is configured to support the synchronization signal block receiving apparatus in performing step S104 and S105 shown in FIG. 2, and/or another process used for the technical solutions described in this specification. The communication interface 402 is configured to support the synchronization signal block receiving apparatus in performing step S103 shown in FIG. 2, and/or another process used for the technical solutions described in this specification. In addition, the synchronization signal block receiving apparatus may further include a memory 403 and a bus 404.

The processor 401 may be a central processing unit, a general-purpose processor, a digital signal processor, an application-specific integrated circuit, a field programmable gate array or another programmable logic device, a transistor logic device, a hardware component, or any combination thereof. Alternatively, the processor may be a combination of processors implementing a computing function, for example, a combination of one or more microprocessors, or a combination of a digital signal processor and a microprocessor.

The communication interface 402 is configured to communicate with another device or communication network, such as the Ethernet, a radio access network, or a wireless local area network.

The memory 403 may be a read-only memory or another type of static storage device that can store static information and instructions, or a random access memory or another type of dynamic storage device that can store information and instructions; or may be an electrically erasable programmable read-only memory, a compact disc read-only memory or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 403 is not limited thereto. The memory 403 may exist independently, and be connected to the processor 401 by using a bus 404. Alternatively, the memory 403 may be integrated with the processor 401. The memory 403 is configured to store a software program for executing the solutions provided in this embodiment of the present invention, and the processor 401 controls execution of the software program.

The bus 404 may be a peripheral component interconnect bus, an extended industry standard architecture bus, or the like. The bus may be classified into an address bus, a data bus, a control bus, and the like. For ease of representation, only one thick line is used to represent the bus in FIG. 18, but this does not mean that there is only one bus or only one type of bus.

An embodiment of this application further provides a computer-readable storage medium. The computer-readable storage medium stores computer instructions. When the computer-readable storage medium runs on a second terminal, the second terminal is enabled to perform the method shown in FIG. 2.

An embodiment of this application further provides a chip system. The chip system includes a processor, configured to support a second terminal in implementing the method shown in FIG. 2. In a possible design, the chip system further includes a memory. The memory is configured to store program instructions and data that are necessary for the second terminal. Certainly, the memory may not exist in the chip system. The chip system may include a chip, or may include a chip and another discrete device. This is not specifically limited in this embodiment of this application.

An embodiment of this application further provides a computer program product including computer instructions. When the computer program product runs on a second terminal, the second terminal can perform the method shown in FIG. 2.

The second terminal, the computer storage medium, the chip system, and the computer program product provided in the embodiments of this application are all configured to perform the synchronization signal block sending and receiving method provided above. Therefore, for beneficial effects that can be achieved by the first terminal, the computer storage medium, the chip system, and the computer program product, refer to beneficial effects corresponding to the methods provided above. Details are not described herein again.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for sending synchronization signal blocks, comprising:
    determining, by a first terminal a synchronization signal block corresponding to each of N antenna panels based on a correspondence between information about locations of M antenna panels and P synchronization signal blocks of the first terminal as well as information about locations of the N antenna panels, wherein the information about the locations of the M antenna panels indicates the locations of the M antenna panels on the first terminal, and the N antenna panels are comprised in the M antenna panels, wherein M, N, and P are positive integers, N is less than or equal to M, and P is an integer multiple of M; and
    separately sending, by the first terminal using each of the N antenna panels, the synchronization signal block corresponding to each of the N antenna panels.

2. The method of claim 1, wherein the synchronization signal block indicates information about a location of an antenna panel that sends the synchronization signal block.

3. The method of claim 1, wherein the synchronization signal block comprises a primary synchronization signal, a secondary synchronization signal, and a physical broadcast channel.

4. The method of claim 3, wherein the correspondence between the information about the locations of the M antenna panels and the P synchronization signal blocks comprises:
    a correspondence between the information about the locations of the M antenna panels and P resource mapping modes, wherein a resource mapping mode indicates a location of a time-frequency resource occupied by the primary synchronization signal and a location of a time-frequency resource occupied by the secondary synchronization signal in the synchronization signal block.

5. The method of claim 3, wherein the correspondence between the information about the locations of the M antenna panels and the P synchronization signal blocks comprises:
   a correspondence between the information about the locations of the M antenna panels and sequences of P secondary synchronization signals.

6. The method of claim 5, wherein a sequence of the secondary synchronization signal is generated according to the following formula:

$$c(n)=(x_0(n+i_1+k)+x_1(n+i_2+l)) \bmod 2, \text{ wherein}$$

c(n) is the sequence of the secondary synchronization signal, wherein n is an integer greater than or equal to 0 and less than or equal to 126;

$$i_1 = \left(3 \times \left\lfloor \frac{NID1}{112} \right\rfloor + NID2\right) \times 5,$$

wherein NID1 is an identifier of a physical cell identifier group, NID1 is an integer greater than or equal to 0 and less than or equal to 335, NID2 is an intra-group identifier of the physical cell identifier group, and a value range of NID2 is {0, 1, 2};
   $i_2$=(NID1)mod 112;
   $x_0(n)$ and $x_1(n)$ are both M-sequences; and
   both k and l are integers, and k and l are determined based on the information about the location of the antenna panel.

7. The method of claim 1, wherein
   P is equal to M, and information about a location of one of the M antenna panels of the first terminal corresponds to one of the M synchronization signal blocks; or
   P is greater than at least twice M, and information about a location of one of the M antenna panels of the first terminal corresponds to at least two of the P synchronization signal blocks.

8. An apparatus for sending synchronization signal blocks, comprising:
   a processor configured to determine a synchronization signal block corresponding to each of N antenna panels based on a correspondence between information about locations of M antenna panels and P synchronization signal blocks of the synchronization signal block sending apparatus as well as information about locations of the N antenna panels, wherein the information about the locations of the M antenna panels indicates the locations of the M antenna panels on the synchronization signal block sending apparatus, and the N antenna panels are comprised in the M antenna panels, wherein M, N and P are positive integers, N is less than or equal to M, and P is an integer multiple of M; and
   a communications interface configured to separately send, using each of the N antenna panels, the synchronization signal block corresponding to each of the N antenna panels.

9. The apparatus of claim 8, wherein the synchronization signal block indicates information about a location of an antenna panel that sends the synchronization signal block.

10. The apparatus of claim 8, wherein the synchronization signal block comprises a primary synchronization signal, a secondary synchronization signal, and a physical broadcast channel.

11. The apparatus of claim 10, wherein the correspondence between the information about the locations of the M antenna panels and the P synchronization signal blocks comprises:
   a correspondence between the information about the locations of the M antenna panels and P resource mapping modes, wherein a resource mapping mode indicates a location of a time-frequency resource occupied by the primary synchronization signal and a location of a time-frequency resource occupied by the secondary synchronization signal in the synchronization signal block.

12. The apparatus of claim 10, wherein the correspondence between the information about the locations of the M antenna panels and the P synchronization signal blocks comprises:
   a correspondence between the information about the locations of the M antenna panels and sequences of P secondary synchronization signals.

13. The apparatus of claim 12, wherein a sequence of the secondary synchronization signal is generated according to the following formula:

$$c(n)=(x_0(n+i_1+k)+x_1(n+i_2+l)) \bmod 2, \text{ wherein}$$

c(n) is the sequence of the secondary synchronization signal, wherein n is an integer greater than or equal to 0 and less than or equal to 126;

$$i_1 = \left(3 \times \left\lfloor \frac{NID1}{112} \right\rfloor + NID2\right) \times 5,$$

wherein NID1 is an identifier of a physical cell identifier group, NID1 is an integer greater than or equal to 0 and less than or equal to 335, NID2 is an intra-group identifier of the physical cell identifier group, and a value range of NID2 is {0, 1, 2};
   $i_2$=(NID1)mod 112;
   $x_0(n)$ and $x_1(n)$ are both M-sequences; and
   both k and l are integers, and k and l are determined based on the information about the location of the antenna panel.

14. The apparatus of claim 8, wherein
   P is equal to M, and information about a location of one of the M antenna panels of the synchronization signal block sending apparatus corresponds to one of the M synchronization signal blocks; or
   P is greater than at least twice M, and information about a location of one of the M antenna panels of the synchronization signal block sending apparatus corresponds to at least two of the P synchronization signal blocks.

15. A non-transitory computer-readable storage medium, wherein the computer-readable storage medium stores a computer program, the computer program comprises program instructions, and when the program instructions are executed by a processor, the processor performs operations, comprising:
   determining, by a first terminal a synchronization signal block corresponding to each of N antenna panels based on a correspondence between information about locations of M antenna panels and P synchronization signal blocks of the first terminal as well as information about locations of the N antenna panels, wherein the information about the locations of the M antenna panels indicates the locations of the M antenna panels on the first terminal, and the N antenna panels are comprised in the M antenna panels, wherein M, N, and P are positive integers, N is less than or equal to M, and P is an integer multiple of M; and separately sending, by the first terminal using each of the N antenna panels, the synchronization signal block corresponding to each of the N antenna panels.

16. The non-transitory computer-readable storage medium of claim 15, wherein the synchronization signal block indicates information about a location of an antenna panel that sends the synchronization signal block.

17. The non-transitory computer-readable storage medium of claim 15, wherein the synchronization signal block comprises a primary synchronization signal, a secondary synchronization signal, and a physical broadcast channel.

18. The non-transitory computer-readable storage medium of claim 17, wherein the correspondence between the information about the locations of the M antenna panels and the P synchronization signal blocks comprises:

a correspondence between the information about the locations of the M antenna panels and P resource mapping modes, wherein a resource mapping mode indicates a location of a time-frequency resource occupied by the primary synchronization signal and a location of a time-frequency resource occupied by the secondary synchronization signal in the synchronization signal block.

19. The non-transitory computer-readable storage medium of claim 17, wherein the correspondence between the information about the locations of the M antenna panels and the P synchronization signal blocks comprises:

a correspondence between the information about the locations of the M antenna panels and sequences of P secondary synchronization signals.

20. The non-transitory computer-readable storage medium of claim 19, wherein a sequence of secondary synchronization signal is generated according to the following formula:

$$c(n)=(x_0(n+i_1+k)+x_1(n+i_2+l)) \bmod 2, \text{ wherein}$$

c(n) is the sequence of the secondary synchronization signal, wherein n is an integer greater than or equal to 0 and less than or equal to 126;

$$i_1 = \left(3 \times \left\lfloor \frac{NID1}{112} \right\rfloor + NID2\right) \times 5,$$

wherein NID1 is an identifier of a physical cell identifier group, NID1 is an integer greater than or equal to 0 and less than or equal to 335, NID2 is an intra-group identifier of the physical cell identifier group, and a value range of NID2 is {0, 1, 2};

$i_2 = (NID1) \bmod 112$;

$x_0(n)$ and $x_1(n)$ are both M-sequences; and both k and l are integers, and k and l are determined based on the information about the location of the antenna panel.

21. The non-transitory computer-readable storage medium of claim 15, wherein

P is equal to M, and information about a location of one of the M antenna panels of the first terminal corresponds to one of the M synchronization signal blocks; or P is greater than at least twice M, and information about a location of one of the M antenna panels of the first terminal corresponds to at least two of the P synchronization signal blocks.

* * * * *